(12) United States Patent
Chang et al.

(10) Patent No.: US 7,088,454 B2
(45) Date of Patent: Aug. 8, 2006

(54) FULL-FIELD OPTICAL COHERENCE TOMOGRAPHY AND ITS APPLICATION TO MULTIPLE-LAYER INFORMATION DECODING

(75) Inventors: Shoude Chang, Ottawa (CA); Xinping Liu, Ottawa (CA); Chander P. Grover, Ottawa (CA)

(73) Assignee: National Research Council of Canada, Ottawa (CA)

( * ) Notice: Subject to any disclaimer, the term of this patent is extended or adjusted under 35 U.S.C. 154(b) by 287 days.

(21) Appl. No.: 10/601,548

(22) Filed: Jun. 24, 2003

(65) Prior Publication Data

US 2004/0263859 A1    Dec. 30, 2004

(51) Int. Cl.
*G01B 9/02*    (2006.01)

(52) U.S. Cl. ..................................... 356/497; 356/512

(58) Field of Classification Search ................ 356/479, 356/497, 504, 517, 489, 495, 511, 512
See application file for complete search history.

(56) References Cited

U.S. PATENT DOCUMENTS 5,465,147 A * 11/1995 Swanson ..................... 356/497
6,088,100 A *  7/2000 Brenan et al. .............. 356/511

OTHER PUBLICATIONS

Dubois, Arnaud et al., "High-resolution full-field optical coherence tomography with a Linnik microscope", Applied Optics, vol. 41, No. 4, 2002.

Dubois, Arnaud, "Phase-map measurements by interferometry with sinusoidal phase modulation and four integrating buckets", Optical Society of America, vol. 18, No. 8, 2001.

Akiba M. et al "En-face optical coherence imgaing for three-dimensional microscopy" Proceedings of the SPIE—The International Society For Optical Engineering Spie-Int. vol. 4621, May 2002, pp. 8-15.*

Akiba M, et al; "Full-field optical coherence tomograpy by two-dimensional heterodyne detection with a pair of CCD cameras" Optics Letters Opt. Soc. America USA, vol. 28, No. 10, May 15, 2003 pp. 816-818, XPO02340831 ISSN: 0146-9592.

(Continued)

*Primary Examiner*—Gregory J. Toatley, Jr.
*Assistant Examiner*—Patrick Connolly
(74) *Attorney, Agent, or Firm*—Marks & Clerk; Richard J. Mitchell

(57) ABSTRACT

A method of extracting a tomographic image of a layer within a body by optical coherence tomography, involves capturing three images, namely a non-interference background image, a first interference-fringe image of said layer, and a second interference-fringe image phase-shifted relative to the first interference-fringe image. The tomographic image is obtained by mathematically combining the three captured images. In a preferred embodiment random noise is removed by averaging and inter-layer effects are removed by applying a compensation function. This system is then used to extract the 2D cross-sectional images encoded in a multiple-layer information carrier.

22 Claims, 5 Drawing Sheets

OTHER PUBLICATIONS

Ovryn B et al Temporal averaging of phase measurements in the presence of spurious phase drift: Applied Optics USA, vol. 32, No. 7, Mar. 1, 1993, pp. 1087-1094, XP002340832 ISSN: 0003-6935.

Akiba M. et al "En-face optical coherence imaging for three-dimensional microscopy" Proceedings of the SPIE — The International Society For Optical Engineering Spie-Int. vol 4621, 2002, pp. 8-15, XPOO2340833 ISSN: 0277-786X.

Colucci D et al; "Millisecond Phase Acquisition at Video Rates" Applied Optics, Optical Society of America, vol. 31, No. 28- Oct. 1, 1992, pp. 5919-5925 XP000306974 ISSN: 0003-6935.

Wizinowich P L "Phase Shifting Interferometry in the Presence of Vibration: A New Algorithm and System" Applied Optics, Optical Society of America, vol. 29, No. 22, Aug. 1, 1990, pp. 3271-3279, XP000136764 ISSN: 0003-6935 Section 11 "2+1 algorithm".

* cited by examiner

FULL-FIELD OPTICAL COHERENCE TOMOGRAPHY AND ITS APPLICATION TO MULTIPLE-LAYER INFORMATION DECODING

FIELD OF THE INVENTION

This relates generally to the field of optical interference tomography, and in particular to a method and apparatus for performing full-field optical coherence tomography for multiple-layer structure imaging and information retrieval.

BACKGROUND OF THE INVENTION

Tomography is the art of creating an image of a sectional plane within a body. Optical coherence tomography (OCT) is a technique for high-resolution cross-sectional imaging of scattering media. The basic technique is described in Brett E. Bouma and Guillermo J. Tearney, Handbook of Optical Coherence Tomography. Marcel Dekker Inc., New York Basel, 2002, the contents of which are herein incorporated by reference.

Most OCT systems use 3-axis point-scanning based technology. However, this technique is slow and cumbersome. A few OCT systems work directly on a two-dimensional full field image using a sinusoidal-phase-modulation method. Examples of such systems are described in Arnaud Dubois, Laurent Vabre, Albert-Claude Boccara and Emmanuel Beaurepaire, "High-resolution full-field optical coherence tomography with a Linnik microscope", Applied Optics, 41, 4, 805–812, 2002; and Arnaud Dubois, "Phase-map measurements by interferometry with sinusoidal phase modulation and four integrating buckets," Journal of Optic Society of America, A, 18, 8, 1972–1979, 2001. The related electronics hardware and algorithm make such systems complex and expensive.

SUMMARY OF THE INVENTION

The present invention simplifies the full field OCT system and overcomes other limitations including the inter-layer effect compensation and phase noise removal. The invention is especially well-suited to the decoding of information from multi-layer carriers, although it can have other applications in the field of tomography.

According to the present invention there is provided a method of extracting a tomographic image of a target layer within a body by optical coherence tomography, comprising capturing a non-interference background image $I_d(x,y)$ of the body; capturing a first interference-fringe image of said target layer $I_0(x,y)$; capturing a second interference-fringe image $I_\phi(x,y)$ of said target layer phase-shifted by an amount $\phi$ relative to said first interference-fringe image; and computing said tomographic image $A(x,y)$ by mathematical manipulation of said non-interference image and said first and second interference-fringe images.

The method in accordance with the invention allows information to be encoded on multiple layers within a carrier and then quickly and conveniently retrieved by OCT. In a preferred embodiment random phase noise is removed by averaging images taken at different times. Image distortion resulting from inter-layer effects is compensated by applying a compensation operation.

In a further aspect the invention provides an apparatus for extracting a tomographic image of a target layer within a body by optical coherence tomography, comprising an interferometer for creating interference-fringe images of layers within said body; a camera for capturing images of said body including a non-interference background image $I_d(x,y)$; a computer for controlling said interferometer to enable said camera to capture a first interference-fringe image of said target layer $I_0(x,y)$ and a second interference-fringe image $I_\phi(x,y)$ of said target layer phase-shifted by an amount $\phi$ relative to said first interference-fringe image; and said computer being programmed to compute said tomographic image $A(x,y)$ by mathematical manipulation of said non-interference background image and said first and second interference-fringe images.

The interferometer is preferably a Michelson interferometer, although other types of interferometer may be employed.

In a still further aspect the invention provides a method of encoding information on a carrier, comprising providing a substrate having a solid background color; and providing a stack of multiple layers on said substrate, each having information printed thereon with a transparent ink.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
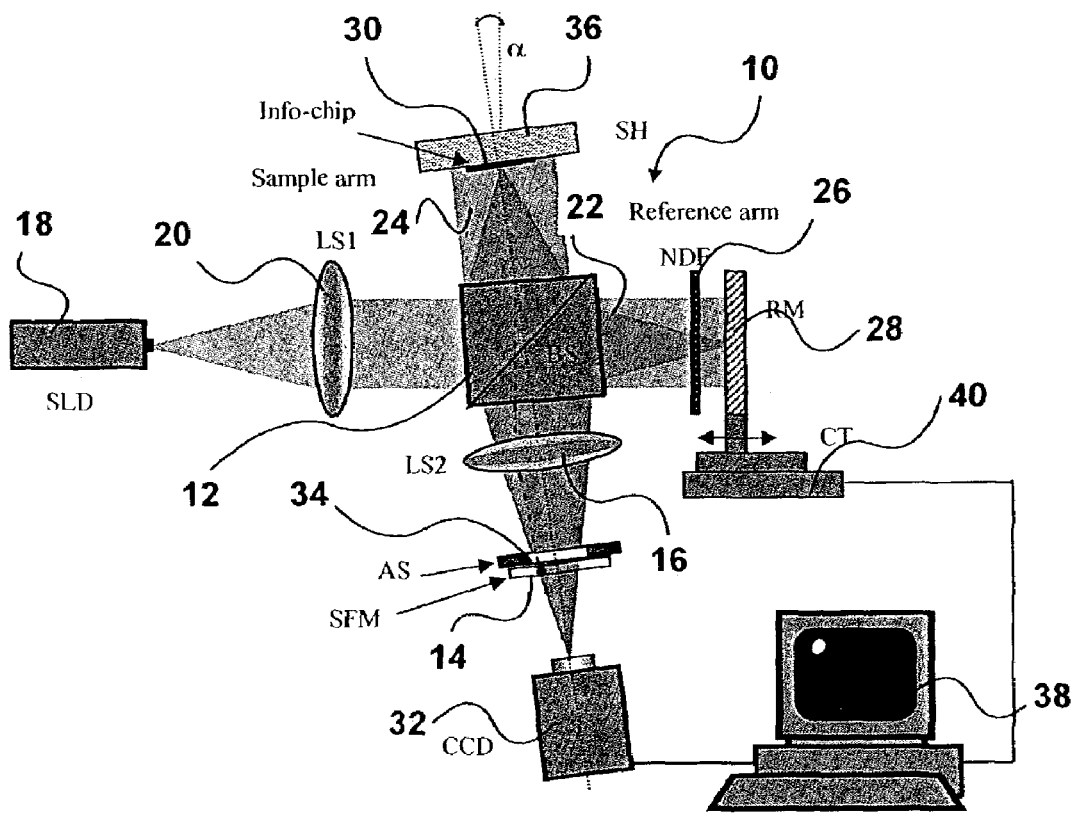
FIG. 1 is a simplified diagram showing an optical coherence tomography system.

The invention relies on optical coherence tomography. This utilizes a partial coherence light source and interferometer, typically a Michelson interferometer, to extract the cross-sectional images at different depth or layer within a body. In the preferred embodiment the body is an information carrier having multiple layers having information printed on them with a transparent ink.

In a multi-layer body, the interference image generated by a selected layer can be written as $$I_0(x,y) = I_d(x,y) + A(x,y)\sin\phi(x,y), \quad (1)$$

where $I_0(x,y)$ is the received image, $I_d(x,y)$ is the direct-reflection image or background image, $A(x,y)$ is the image at this layer, $\sin(\ )$ represents the interference-fringe.

To obtain the real image $A(x,y)$ from Eq. (1), three images are needed. The first one is $I_d(x,y)$, which can be obtained as the non-interference background image. The second image, $I_0(x,y)$ is captured as the interference-fringe image defined by Eq. (1). The last one, $I_{\pi/2}(x,y)$, is captured as that of the $I_0(x,y)$ with a phase difference of $\pi/2$ introduced to the beam, $$I_{\pi/2}(x, y) = I_d(x, y) + A(x, y)\sin[\phi(x, y) + \pi/2] \quad (2)$$
$$= I_d(x, y) + A(x, y)\cos\phi(x, y).$$

In order to obtain the image A(x,y) from equations 1 and 2, the first step is to eliminate the direct-reflection image:

$$D_1(x,y) = I_0(x,y) - I_d(x,y) = A(x,y)\sin\phi(x,y), \quad (3)$$

$$D_2(x,y) = I_{\pi/2}(x,y) - I_d(x,y) = A(x,y)\cos\phi(x,y). \quad (4)$$

Then, the interference fringes can be removed by the summation of $D_1$ and $D_2$ squared $$D_1^2(x, y) + D_2^2(x, y) = A^2(x, y)\sin^2\phi(x, y) + A^2(x, y)\cos^2\phi(x, y) \quad (5)$$
$$= A^2(x, y)[\sin^2\phi(x, y) + \cos^2\phi(x, y)]$$
$$= A^2(x, y).$$

Finally, the image A(x,y) can be obtained from the equation $$A(x, y) = \{D_1^2(x, y) + D_2^2(x, y)\}^{1/2} \quad (6)$$
$$= \{[(I_0(x, y) - I_d(x, y)]^2 + [(I_{\pi/2}(x, y) - I_d(x, y)]^2\}^{1/2}.$$

In fact, the phase $\pi/2$ in Eq. (2) can be replaced by any arbitrary phase $\phi$, in which case $$I_\phi(x,y) = I_d(x,y) + A(x,y)\sin[\phi(x,y) + \phi], \text{ and} \quad (7)$$

$$D_2 = A(x,y)\sin[\phi(x,y) + \phi],$$

Eq. (6) can be generalized to $$A = \{D_1^2 + [(D_2 - D_1 \cos\phi)/\sin\phi]^2\}^{1/2}. \quad (8)$$

When $\phi = \pi/2$, Eq. (5) and Eq. (7) are identical.

To remove the random noise resulting from unsteady phase changes and vibrations, it is desirable to capture N images of $I_d(x,y)$ and $I_\phi(x,y)$ at different times. These can be averaged in accordance with $$I_0(x,y) = (1/N)\Sigma_i I_0(x,y)|_{t=i}, i=1, 2, 3, \ldots N$$

and $$I_\phi(x,y) = (1/N)\Sigma_i I_\phi(x,y)|_{t=i}, i=1, 2, 3, \ldots N \quad (9)$$

The depth resolution of an OCT system is determined by coherence length of the light source.

The configuration of one practical embodiment of an optical system for implementing the above method is shown in FIG. 1. This consists of a modified Michelson interferometer 10 that incorporates a tilted cubic beam splitter 12 and a spatial filter mask 14 associated with an aperture stop 34 set in the back focal plane of the lens 16. This tilt angle α should be below about 5° and in this example is about 1.7°. The interferometer 10 has as a light source a superluminescent diode 18. As in any OCT system, the depth resolution is determined by the coherence length of the light source.

The output of the superluminescent diode 18 is collimated by lens 20. The non-polarizing beam splitter 12 separates light into the reference arm 22 and sample arm 24 of the interferometer. A neutral density filter 26 is used to adjust the intensity of the reference beam reflected from the reference mirror 28 mounted on a translation stage 40 controlled by computer 38.

The lens 16 images the sample, info-chip or information carrier 30 mounted on sample holder 36 on the CCD camera 32 connected to the computer 38. The information carrier 30 consists of a substrate with a solid black background layer and a plurality of transparent information layers each bearing information printed with a transparent ink.

By performing a Fourier transform, the lens 16 focuses the strong light reflected from the surfaces of the beam splitter on the blocking area of the spatial filter mask 14. This results in the minimization of the DC noise resulting from the beam splitter 12.

The spatial filter mask 14 is a two-dimensional DC block function defined by $$f(x, y) = \begin{cases} 0, & \subset A_s(x, y) \\ 1, & \text{otherwise} \end{cases}, \quad (10)$$

where A(x,y) is the DC spot formed by the reflective lights of BS surfaces passing through the lens 16.

The tilting angle α of the beam splitter 12 ensures the spatial filter mask 14 only removes the DC component coming from beam splitter 12 rather than from the reference mirror 28.

The least thickness of each layer of the information carrier 30 is determined by the depth resolution of the OCT, which as noted above in turn depends on the coherence length of the light source. Both sides of the layer are coated with anti-reflective coating. The encoding procedure involves writing or printing the two dimensional information, image or text, on one side of a layer. The ink applied should be transparent and be distributed evenly.

Figure 2:
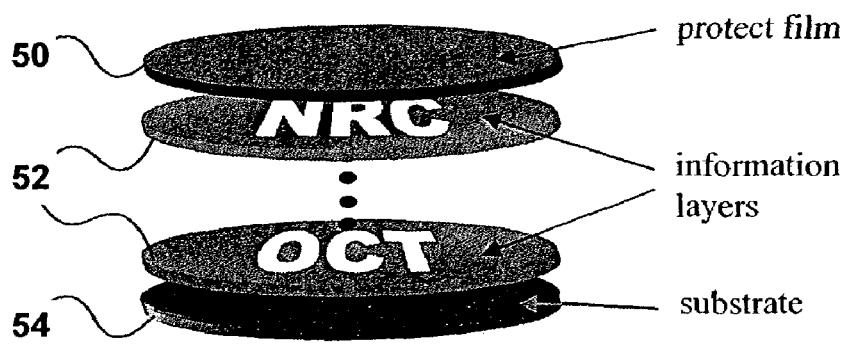
FIG. 2 shows the structure of an info-chip.

The differences of phase and reflectance between the ink and surface of the layer make the two-dimensional information distinguishable. For the purpose of protection, a hard film with a near infra-red window is provided at the top of the chip. The information layers are all bonded together and mounted on a substrate that is solid and completely black. FIG. 2 shows one example of an info chip 30. Multiple information layers 52 are supported on substrate 54 and protected by a protective film 50.

The optical system described with reference to FIG. 1 can be used to extract the cross-sectional image at each layer. In this exemplary embodiment, the superluminescent diode 18 forming the light source has a central wavelength is 830 nm and longitudinal resolution of 20 μm. The information carrier 30 is placed on the sample holder 36 in the sample arm 24 and a suitable reference mirror 28 is mounted on the reference arm 22 of the interferometer.

The computerized translation stage 40 controls the position of the reference mirror 28 such that it can scan through the info-chip 30 by moving the reference mirror 28. The CCD camera 32 captures the image from the appropriate information layer 52 and transfers the data to the computer 38.

As discussed above, three images are needed to produce a tomography image. The first image, direct-reflection image $I_d(x,y)$, is obtained before the scanning starts, and with the optical path length of the reference arm set to be shorter than the length of sample arm. Subsequently, during the course of scanning the carrier, at each layer of the OCT system captures two interference images: a direct interference image, and a π/2-phase-difference image. These can be generated either by a positioner or by a phase retardation plate. From these images, The computer 38 obtains the cross-sectional image of the selected layer by solving Eq. (5) or (6). Equation (8) may be used to remove the random phase noise; this procedure requires capturing more images at the each position for $I_0(x,y)$ and $I_\phi(x,y)$.

To remove the inter-layer effect, the computer 38 should preferably perform a compensation operation for the OCT image $A(x,y)$ at each layer by applying a compensation operation $$F(x,y)=[A(x,y)+k\cdot I_d(x,y)]^m, \qquad (11)$$

where k is a weighting factor, range 0~1 and m is an index, 1~3. $F(x,y)$ is the fully compensated tomography image.

Figure 3:
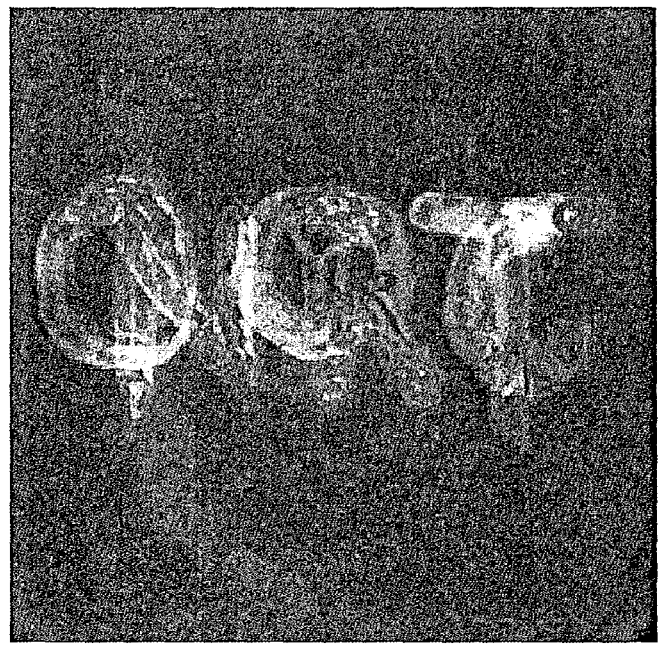
FIG. 3 shows a direct reflection image of the info-chip.
Figure 4:
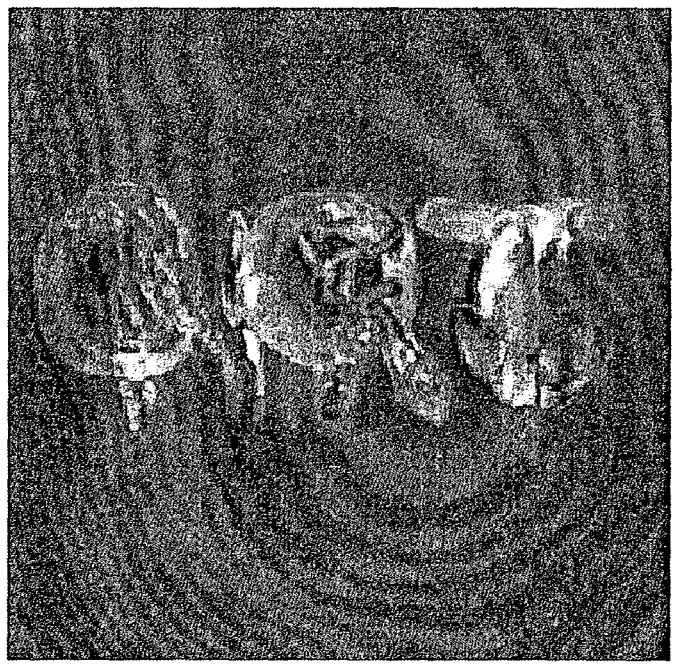
FIG. 4 shows the interference image at the first layer.
Figure 5:
FIG. 5 shows the interference image at the second layer.
Figure 6:
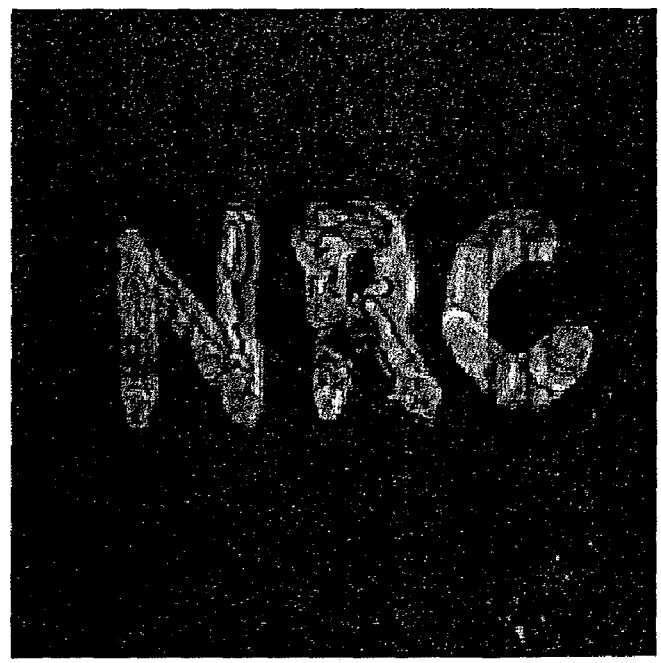
FIG. 6 shows the interference-fringe-removed image of the first layer.
Figure 7:
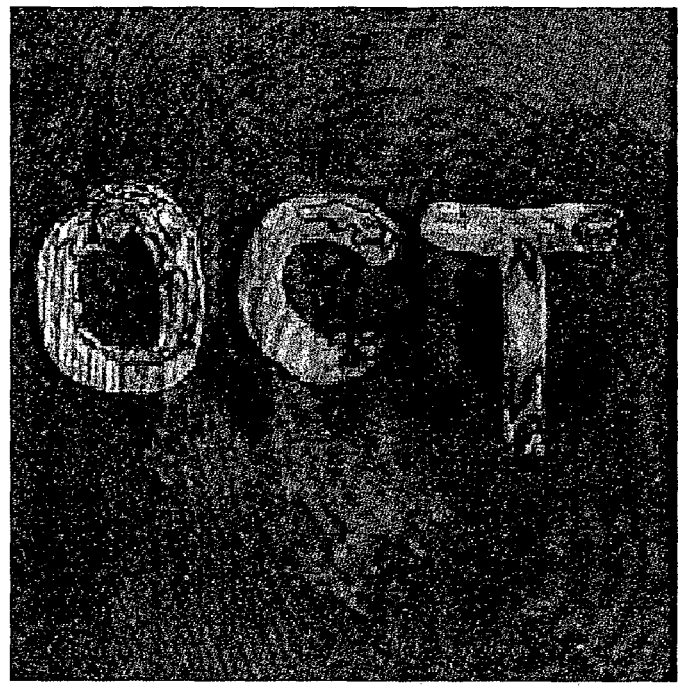
FIG. 7 shows the interference-fringe-removed image of the second layer.
Figure 8:
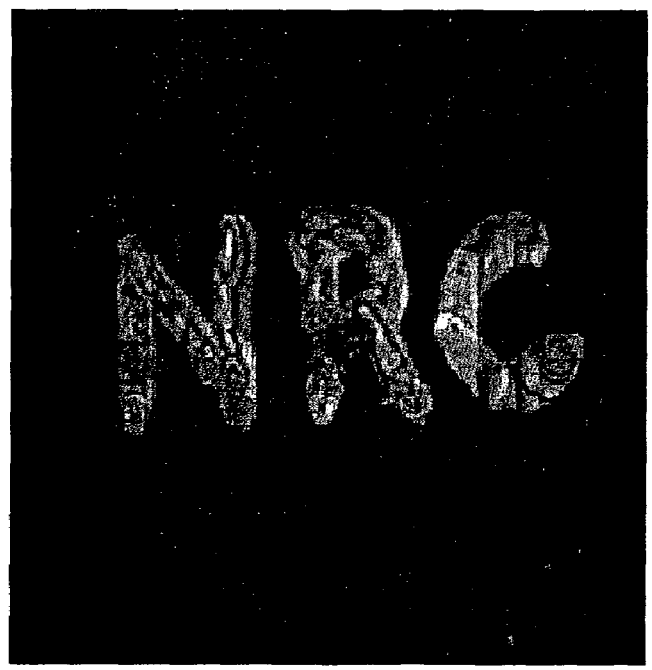
FIG. 8 shows the inter-compensated image of the first layer.
Figure 9:
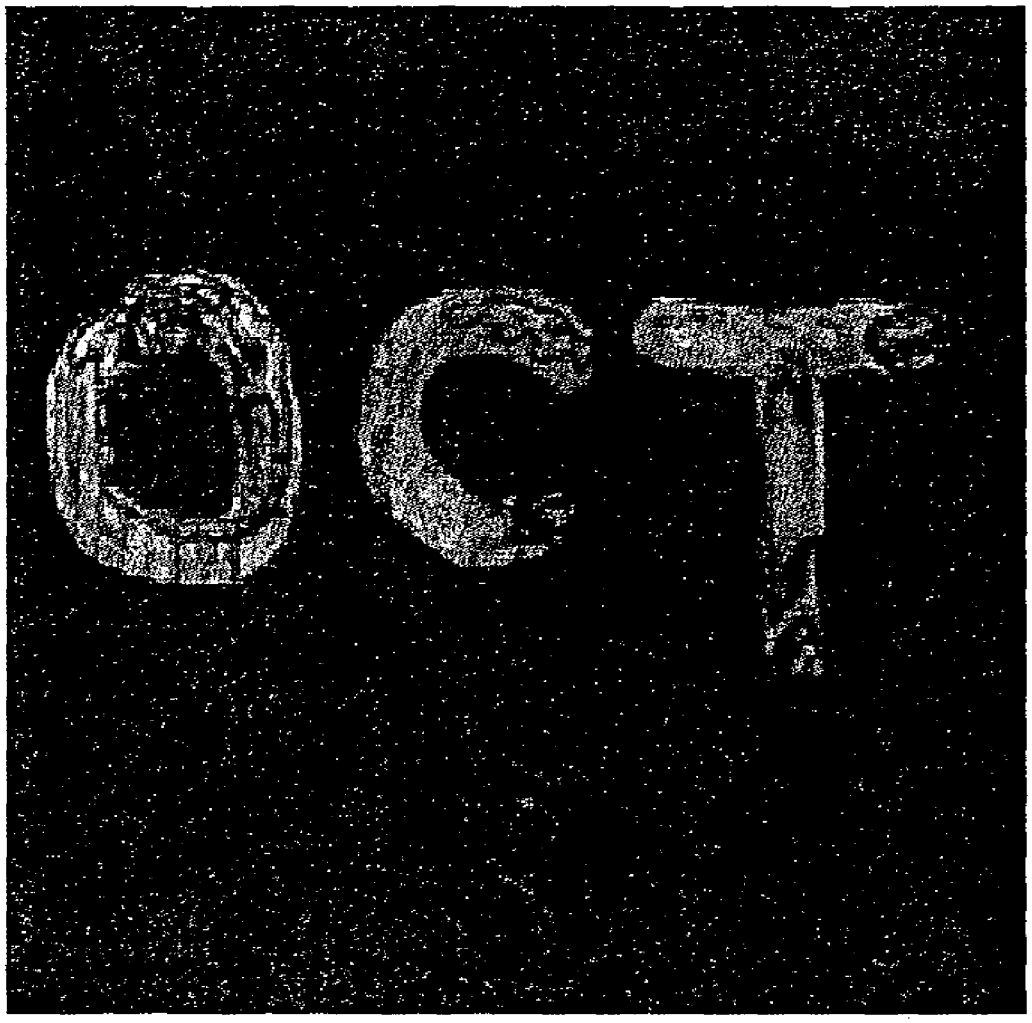
FIG. 9 shows the inter-compensated image of the second layer.

FIGS. 3 to 9 show a set of images obtained during decoding of an information carrier. The information encoded on the first layer is "NRC", and second layer is "OCT". FIG. 3 shows an IR image $I_d(x,y)$, the direct-reflection image of the carrier, on which "OCT" and "NRC" are overlapped and fused together. FIGS. 4 and 5 show the interference images at the first and second layer, respectively. The tomography images of the first layer and the second layer are shown in FIG. 6 and FIG. 7. FIG. 8 and FIG. 9 show the inter-compensated images of the first layer and second layer, respectively.

Though the above system is described using a Michelson interferometer, other types of interferometer are also applicable to the invention. It will be further understood by persons skilled in the art that numerous other embodiments may be envisaged without departing from the spirit and scope of the invention.

We claim:

1. A method of extracting a tomographic image of a target layer within a body by optical coherence tomography, comprising:
   a) capturing a non-interference direct-reflection image $I_d(x,y)$ of the body as a stand-alone image separately from an interference-fringe image;
   b) capturing a first interference-fringe image of said target layer $I_0(x,y)$;
   c) capturing a second interference-fringe image $I_\phi(x,y)$ of said target layer phase-shifted by an amount φ relative to said first interference-fringe image; and
   d) computing said tomographic image $A(x,y)$ by mathematical manipulation of said non-interference image and said first and second interference-fringe images.

2. The method of claim 1, wherein multiple first and second interference-fringe images are obtained of said target layer at different times, and said multiple first and second interference-fringe images are processed to remove random noise.

3. The method of claim 1, wherein said tomographic image is obtained by solving the equation:

$$A=\{D_1^2+[(D_2-D_1\cos\phi)/\sin\phi]^2\}^{1/2}$$

where $D_1=I_0(x,y)-I_d(x,y)$, and $D_2=I_\phi(x,y)-I_d(x,y)$.

4. The method of claim 1, wherein said amount φ is π/2, and said tomographic image is obtained by solving the equation:

$$A(x,y)=\{[I_0(x,y)-I_d(x,y)]^2+[I_{\pi/2}(x,y)-I_d(x,y)]^2\}^{1/2}.$$

5. The method of claim 1, wherein each computed tomographic image is compensated by applying a compensation function:

$$F(x,y)=[A(x,y)+k\cdot I_d(x,y)]^m,$$

where k is a weighting factor in the range of about 0~1, m is an index in the range of about 1~3, and $F(x,y)$ is the compensated tomography image.

6. The method of claim 1, wherein said first and second interference-fringe images are obtained with an interferometer having a sample arm and a reference arm, and the optical path length of one of said arms is varied to obtain said first and second interference-fringe images at said target layer.

7. The method of claim 6, wherein said interferometer includes a tilted beam splitter and a spatial filter mask to reduce DC noise.

8. The method of claim 7 wherein said beam splitter is tilted at an angle below about 5°.

9. An apparatus for extracting a tomographic image of a target layer within a body by optical coherence tomography, comprising:
   a) an interferometer for creating interference-fringe images of layers within said body;
   b) a camera for capturing images of said body including a non-interference direct-reflection image as a stand-alone image separately from an interference-fringe image, and;
   c) a computer for controlling said interferometer to enable said camera to capture a first interference-fringe image of said target layer $I_0(x,y)$ and a second interference-fringe image $I_\phi(x,y)$ of said target layer phase-shifted by an amount φ relative to said first interference-fringe image; and
   d) said computer being programmed to compute said tomographic image $A(x,y)$ by mathematical manipulation of said non-interference direct-reflection image and said first and second interference-fringe images.

10. The apparatus of claim 9, wherein said computer is programmed to obtain multiple first and second interference-fringe images of said target layer at different times, and process said multiple images to remove random noise.

11. The apparatus of claim 9, wherein said computer is programmed to compute said tomographic image by solving the equation:

$$A=\{D_1^2+[(D_2-D_1\cos\phi)/\sin\phi]^2\}^{1/2}$$

where $D_1=I_0(x,y)-I_d(x,y)$, and $D_2=I_\phi(x,y)-I_d(x,y)$.

12. The apparatus of claim 9, wherein said amount φ is π/2, and said computer is programmed to compute said tomographic image by solving the equation:

$$A(x,y)=\{[I_0(x,y)-I_d(x,y)]^2+[I_{\pi/2}(x,y)-I_d(x,y)]^2\}^{1/2}.$$

13. The apparatus of claim 9, wherein said computer is programmed to compensate each tomographic image by applying a compensation operation:

$$F(x,y)=[A(x,y)+k\cdot I_d(x,y)]^m,$$

where k is a weighting factor in the range of about 0~1 and m is an index in the range of about 1~3.

14. The apparatus of claim 9, wherein said interferometer has a sample arm and a reference arm and said computer is programmed to vary the optical path length of one said arms to obtain said first and second interference-fringe images at said target layer.

15. The apparatus of claim 14, wherein computer is programmed to vary the length of said reference arm.

16. The apparatus of claim 15, wherein said reference arm includes a reference mirror mounted on a translation stage controlled by said computer.

17. The apparatus of claim 9, wherein said interferometer includes a tilted beam splitter and a spatial filter mask in an image plane to reduce DC noise.

18. The apparatus of claim 17, wherein said spatial filter mask is a two-dimensional block function.

19. A method of decoding information from an information carrier containing information stored on multiple layers within the carrier, comprising:
   a) capturing a non-interference direct-reflection image $I_d(x,y)$ of the carrier as a stand-alone image separately from an interference-fringe image;
   b) capturing a first interference-fringe image of a selected layer $I_0(x,y)$ within said carrier;
   c) capturing a second interference-fringe image $I_\phi(x,y)$ of said layer phase-shifted by an amount $\phi$ relative to said first interference-fringe image; and
   d) computing a tomographic image $A(x,y)$ of said layer by mathematical manipulation of said non-interference image and said first and second captured images to obtain information stored on said selected layer.

20. The method of claim 19, wherein multiple first and second interference-fringe images are obtained of said selected layer at different times, and said multiple images are processed to remove random noise.

21. The method of claim 19, wherein said tomographic image is obtained by solving the equation:

$$A=\{D_1^2+[(D_2-D_1 \cos \phi)/\sin \phi]^2\}^{1/2}$$

where $D_1=I_0(x,y)-I_d(x,y)$, and $D_2=I_\phi(x,y)-I_d(x,y)$.

22. A method of encoding and retrieving information on a carrier by optical coherent tomography, comprising:
   a) providing a substrate having a solid background color;
   b) providing a stack of multiple layers on said substrate, each having information printed thereon with a transparent ink;
   c) capturing a non-interference direct-reflection image $I_d(x,y)$ of a target layer within the carrier;
   d) capturing a first interference-fringe image of said target layer $I_0(x,y)$;
   e) capturing a second interference-fringe image $I_\phi(x,y)$ of said target layer phase-shifted by an amount $\phi$ relative to said first interference-fringe image;
   and f) computing said tomographic image $A(x,y)$ by mathematical manipulation of said non-interference direct-reflection image and said first and second interference-fringe images.

* * * * *